United States Patent [19]

Pierce et al.

[11] Patent Number: 4,601,378
[45] Date of Patent: Jul. 22, 1986

[54] SUPPORTING BRACKET FOR HYDRAULIC PUMP AND CLUTCH

[75] Inventors: William C. Pierce, Carrollton; Jack E. West, Dallas, both of Tex.

[73] Assignee: Pitts Industries, Inc., Carrollton, Tex.

[21] Appl. No.: 548,314

[22] Filed: Nov. 3, 1983

[51] Int. Cl.⁴ ............................................. F16D 13/68
[52] U.S. Cl. .................................... 192/115; 248/674; 417/360; 417/238
[58] Field of Search .............. 192/115, 84 C; 248/674; 310/91; 417/360, 238

[56] References Cited

U.S. PATENT DOCUMENTS

| | | | |
|---|---|---|---|
| 1,750,170 | 3/1930 | Frisch | 417/238 |
| 2,256,987 | 9/1941 | Meyerhoefer | 192/115 |
| 2,439,241 | 4/1948 | Curtis et al. | 417/360 |
| 3,246,725 | 4/1966 | Brashear | 192/84 C |
| 3,254,746 | 6/1966 | Myers | 192/84 C |
| 3,395,594 | 8/1968 | Blair | 310/91 |
| 3,411,450 | 11/1968 | Clifton | 417/420 |
| 3,924,585 | 12/1975 | Woods | 192/84 C |
| 3,982,856 | 9/1976 | Hehl | 417/360 |
| 4,211,519 | 7/1980 | Hogan | 417/360 |
| 4,300,872 | 11/1981 | Brown et al. | 417/360 |
| 4,311,440 | 1/1982 | Eberhardt | 417/360 |
| 4,471,862 | 9/1984 | Sugita | 192/84 C |

Primary Examiner—Craig R. Feinberg
Assistant Examiner—David A. Okonsky
Attorney, Agent, or Firm—Harvey B. Jacobson

[57] ABSTRACT

A supporting bracket for an electromagnetic clutch and a hydraulic pump driven through the clutch from a drive shaft, belt pulley or other power input by which the various forces exerted on the pump shaft by the clutch and power input are supported by the bracket thereby eliminating excessive wear on the supporting bearing structure for the pump shaft thereby prolonging the useful life of the hydraulic pump and maintaining the clutch components in properly oriented relation for proper and long lasting operation thereof. The bracket includes a supporting member to which the clutch is attached and to which the pump is attached and a supporting foot or pedestal engaged with a supporting surface and rigidly affixed thereto with the supporting bracket taking all of the load off the pump shaft with the pump shaft sliding into the clutch by a spline coupling or in the same manner as a pump shaft would be connected to a truck transmission or the like thereby reducing alignment problems and reducing the skill required by the person installing a hydraulic pump on a truck such as a truck with a trash compactor, lift or other mechanism operated by hydraulic pressure supplied by a hydraulic pump.

6 Claims, 5 Drawing Figures

SUPPORTING BRACKET FOR HYDRAULIC PUMP AND CLUTCH

BACKGROUND OF THE INVENTION

1. Field of the Invention

The present invention generally relates to an electromagnetic clutch combined with a hydraulic pump and more particularly a supporting structure for the combination by which radial and axial thrust loads normally transmitted to the pump shaft are transmitted to the supporting bracket thereby removing such loads from the pump shaft to reduce alignment problems when the pump and clutch are associated with a truck or other vehicle for supplying pressurized hydraulic fluid to various mechanisms on the truck thereby reducing the skill required by the installer to install the pump and clutch and also prolonging the life expectancy of the hydraulic pump by removing substantially all the loads from the pump shaft except for transfer of rotational torque.

2. Description of the Prior Art

Heretofore, clutches associated with a pump to selectively drive a pump from a power input device were mounted directly on the pump shaft with the pump being supported on a suitable bracket structure or the like. The power input device is usually a belt pulley drive or drive shaft. An exemplary use of such hydraulic pumps is on trucks or other similar vehicles having equipment that is operated by pressurized hydraulic fluid. For example, trucks with trash compactors, load lifting devices and the like and various farm and industrial machines have hydraulic operated equipment mounted thereon or associated therewith all of which require a hydraulic pump to provide pressurized hydraulic fluid with the pump normally being driven by a power takeoff from the vehicle engine or transmission. When an electromagnetic clutch is provided, the stationary electromagnetic field is stationarily mounted by a flange-type mounting structure or in some instances, the field is bearing supported or mounted. In any event, when the clutch is mounted on the pump shaft, the pump shaft must support the clutch which is subjected to various forces imparted by the drive input. Many pumps have relatively loose bearings or the bearings become worn thus permitting radial play that can cause clutch rubbing and failure. Also, the bearings in many pumps cannot withstand side loads or lateral forces exerted on the pump shaft by a belt drive. The following U.S. patents are exemplary of the development in this field of endeavor:

U.S. Pat. Nos. 2,874,815, Feb. 29, 1959,
3,153,388, Oct. 20, 1964,
3,292,757, Dec. 20, 1966,
3,411,450, Nov. 19, 1968,
3,680,670, Aug., 1, 1972,
3,807,804, Apr. 9, 1974,
4,211,529, July 8, 1980,
4,311,440, Jan. 19, 1982.

SUMMARY OF THE INVENTION

An object of the present invention is to provide a supporting bracket which mounts a hydraulic pump and also supports an electromagnetic clutch in which the bracket takes all loads off the pump shaft.

Another object of the invention is to provide a supporting bracket having a mounting foot or pedestal attached to a supporting surface and a projecting apertured plate having a large central hole therethrough with the electromagnetic clutch being mounted on one side of the plate and the pump being mounted on the other side thereof with the pump shaft extending through the large hole therein with the pump shaft being connected to the clutch by a conventional splined coupling or the like and the clutch being connected to the input power source regardless of whether it is a drive shaft with a universal coupling and bolted flange arrangement or a drive belt and pulley assembly incorporated into the clutch.

A further object of the invention is to provide a supporting bracket in accordance with the preceding objects in which the supporting brackets enables assembly of the hydraulic pump and clutch with respect to each other and with respect to the drive input without alignment problems thereby reducing the skill required by the person installing the pump and clutch unit.

Still another object of the invention is to provide a supporting bracket or a hydraulic pump and clutch assembly which is simple in construction, easy to assemble with various clutches and pumps, effective for prolonging the life of the clutch and pump by properly aligning these components and eliminating errors in alignment and installation and removing loads from the pump shaft.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
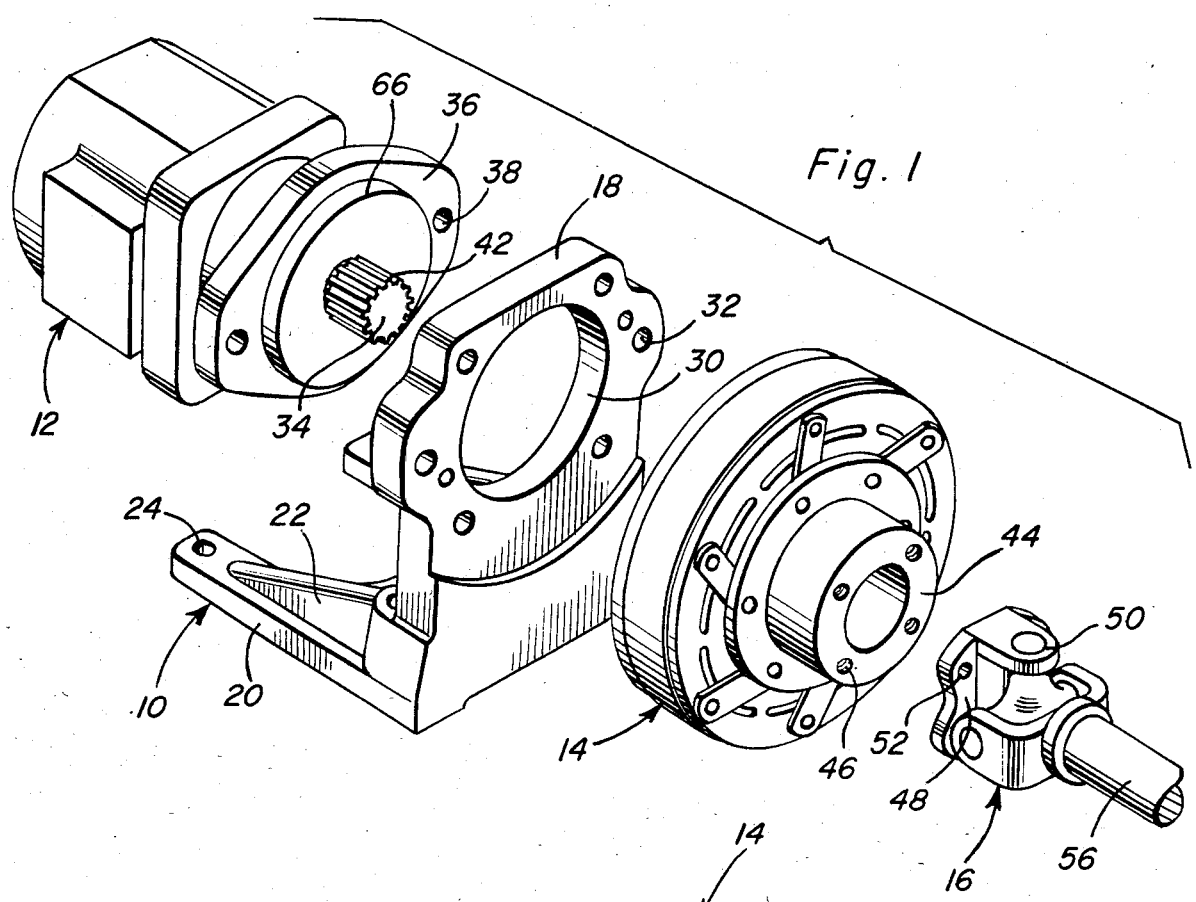
FIG. 1 is an exploded group perspective view of the supporting bracket, hydraulic pump, electromagnetic clutch and input drive shaft of the present invention.
Figure 2:
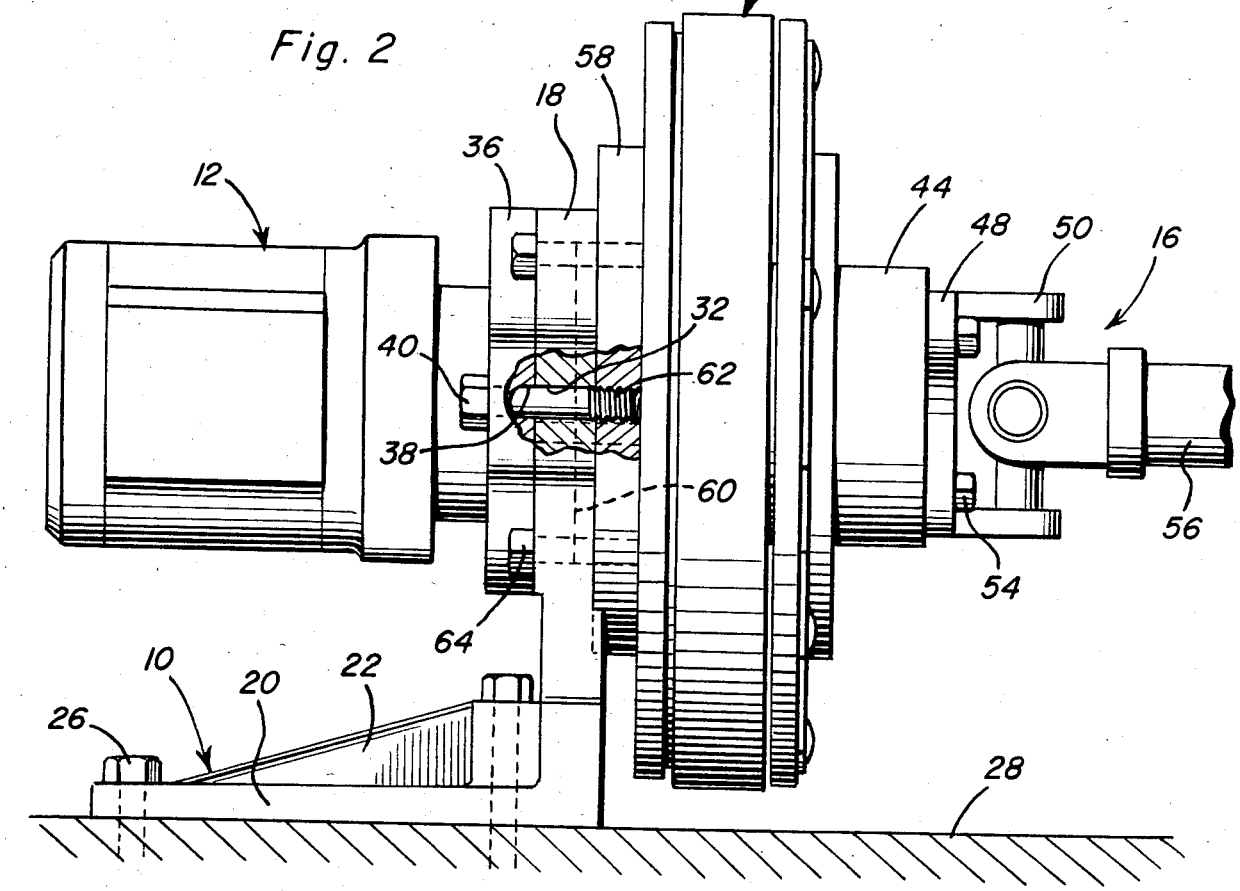
FIG. 2 is a side elevational view of the construction of FIG. 1 in assembled relationship with a portion being broken away.

Referring now specifically to the drawings, the supporting bracket constituting part of the present invention is generally designated by reference numeral 10, a hydraulic pump associated with and supported by the supporting bracket 10 is designated by the numeral 12, an electromagnetic clutch supported from and associated with the bracket 10 is designated by numeral 14 and a power input shaft associated with clutch 14 and the supporting bracket 10 as well as the hydraulic pump 12 is designated by numeral 16. The supporting bracket 10 includes a supporting plate 18 which, as illustrated, is oriented in vertical position but may be oriented in other relationships and a pair of supporting feet 20 integral with the lower edge of the plate 18 and extending perpendicularly therefrom with reinforcing gussets 22 interconnecting the feet 20 and the plate 18. The supporting feet 20 include an aperture or apertures 24 for receiving holddown bolts 26 or other fastening devices for fixedly and securely mounting the bracket 10 on a supporting surface 28 as illustrated in FIG. 2. The plate 18 is provided with an enlarged opening or hole 30 therethrough and a plurality of apertures 32 positioned outwardly and peripherally of the hole or opening 30.

The hydraulic pump 12 is conventional and includes a pump shaft 34 which drives the rotor component of the pump 12 and a mounting flange 36 is provided on the pump housing for engagement with one surface of the plate 18 with apertures 38 being provided in the flange 36 for registry with certain of the apertures 32 in the plate 18 for receiving mounting bolts 40 or the like. The pump shaft 34 is externally splined as at 42 for splined sliding driving engagement with the clutch 14 in a manner similar to which the pump shaft would conventionally be connected to a vehicle transmission or the like.

The electromagnetic clutch 14 is, in and of itself, a conventional component, such as that disclosed in U.S. Pat. Nos. 3,565,223 issued Feb. 23, 1971 and 4,296,851 issued Oct. 27, 1981 with the clutch including an input hub 44 having internally threaded sockets 46 therein for matching engagement with an input plate or flange 48 associated with the power shaft 16 through a universal coupling 50 with apertures 52 being provided in the plate or flange 48 for receiving fastening bolts 54 to connect a drive shaft 56 to the clutch 14 in a conventional manner.

Figure 3:
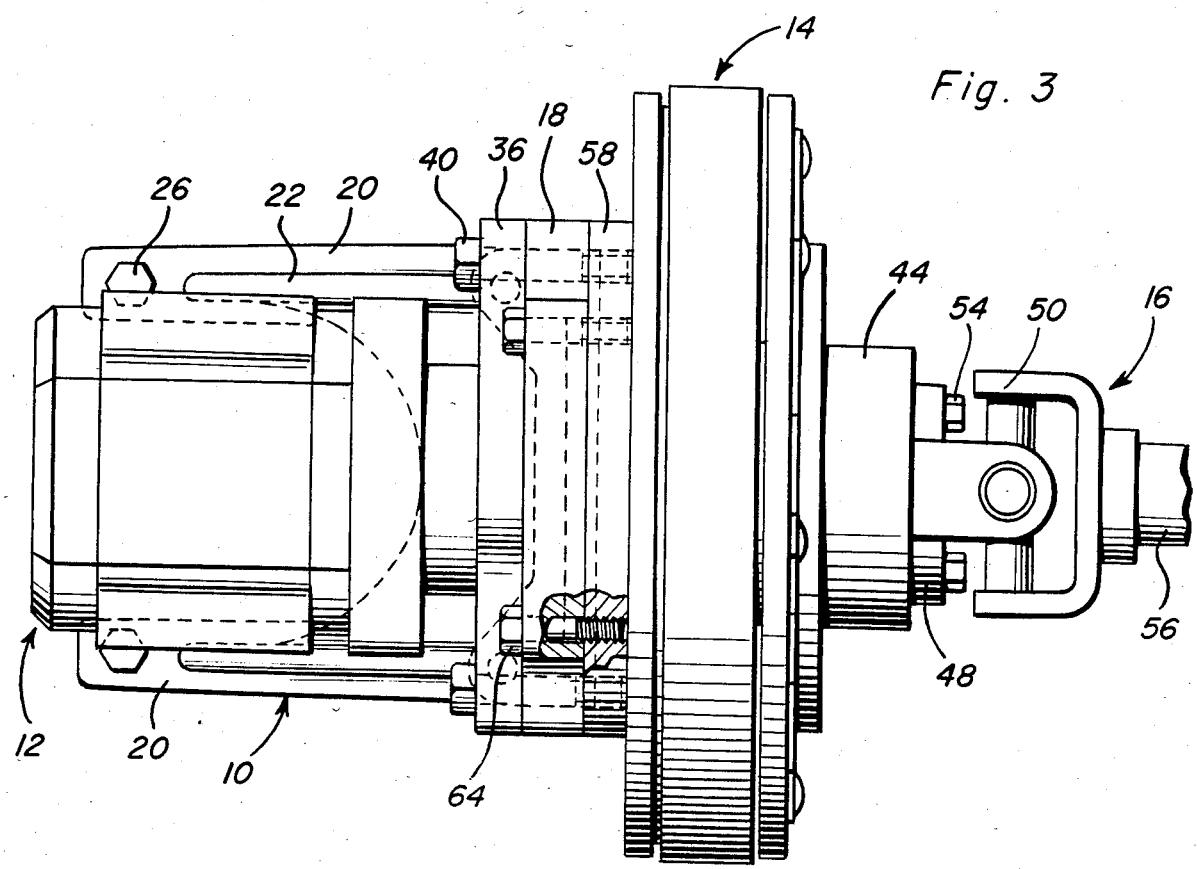
FIG. 3 is a plan view of the construction of FIG. 2.
Figure 4:
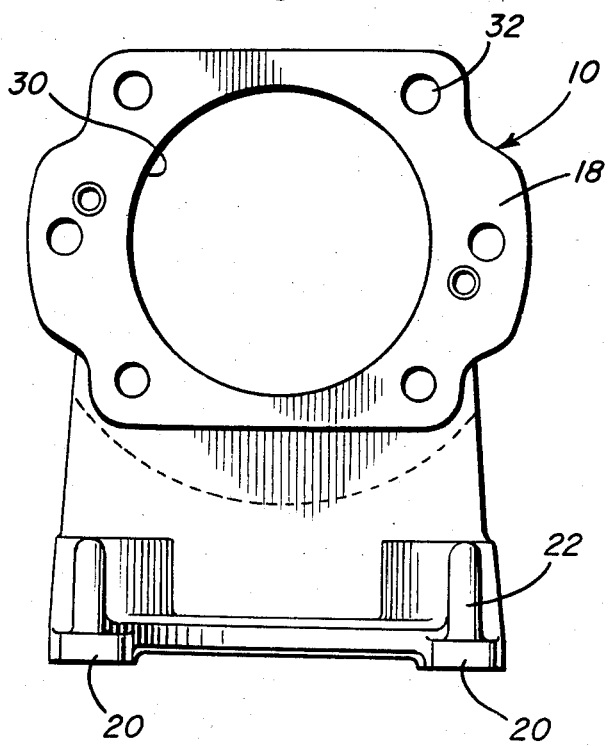
FIG. 4 is an elevational view of the supporting bracket.

The stationary component of the clutch having the electromagnetic field mounted thereon is illustrated in the form of a plate 58 which has a peripheral shoulder 60 formed therein for telescopic engagement into the central hole or opening 30 as illustrated in FIGS. 2 and 3 with the plate 58 including apertures as at 62 which may be internally threaded for receiving the fastening bolts 40 which extend through the flange 36 as well as fastening bolts 64 which extend through the plate 18 into the plate 58 thus enabling selective disassembly of the clutch 14 from the support bracket 10 and disassembly of the pump 12 from the supporting bracket 10. The pump shaft 34 having the external spline surface 42 is in splined engagement with the output component of the clutch 14 so that the pump can be removed without disturbing the clutch and correspondingly, the clutch can be removed. The construction of the plate 58 with its flange or shoulder 60 thereon properly aligns the clutch and bracket and the similar provision of a shoulder 66 on the flange 36 which telescopes into the opening 30 provides proper orientation of the pump shaft 34 and the supporting bracket 10 and also properly orients and aligns the pump shaft 34 with the female splined coupling in the clutch 14 thereby eliminating alignment problems and assuring that the pump, bracket and clutch are all properly aligned thus reducing the skill required for an installer of this assembly. As illustrated, the apertures 32 in the plate 18 are oriented on different bolt center patterns or bolt pattern diameters to enable the supporting brackets to be utilized with various pumps and clutches. Also, the pattern of the internally threaded sockets 46 on the input hub 44 may vary to match input driving flanges with various hole patterns. With this arrangement, all of the forces exerted by the input drive shaft 56, both axial and radial, are supported and absorbed by the supporting bracket 10 rather than being transmitted to the pump shaft 34 thereby prolonging the life expectancy of the pump and also prolonging the life expectancy of the clutch since wear on the pump bearings is not transmitted to the output component of the clutch which occurs when the clutch is directly on the pump shaft which results in clutch rubbing, misalignment, excessive wear and ultimate failure.

While FIGS. 1–4 illustrate an arrangement having a drive shaft input, the present invention may also be used when a single groove or multigroove belt pulley is utilized to drive the clutch 14 with the pulley groove assembly being oriented concentrically of the clutch 14 in a conventional manner. If a pulley belt drive is used, the supporting bracket of the present invention supports all lateral or radial loads exerted by the drive belt engaging the drive pulley.

Figure 5:
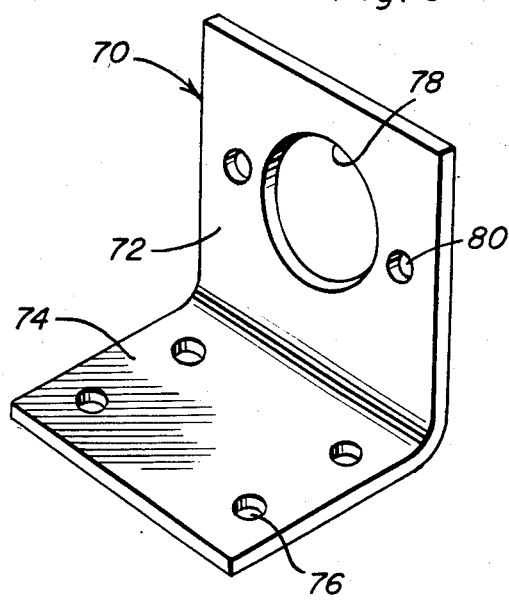
FIG. 5 is a perspective view of a modified embodiment of the supporting bracket.

FIG. 5 illustrates a supporting bracket generally designated by numeral 70 that is especially adapted for use with a clutch having a belt drive with the bracket 70 including a plate 72 and a mounting foot 74 perpendicular thereto with the mounting foot including apertures 76 for receiving fastening bolts (not shown) and the supporting plate 72 including a large central hole or opening 78 receiving a projecting flange on a stationary component of the pulley and apertures 80 receiving mounting bolts for securing the pulley and pump to the supporting plate 72. Rather than apertures 80, the opening 78 may be provided with U-shaped notches communicating with diametrically opposed portion of the opening 78 to facilitate reception of mounting bolts for the pump and clutch.

In all of the embodiments of the invention, the supporting bracket is rigidly secured to a supporting surface and the pump and clutch are rigidly connected to the supporting bracket with both the clutch and pump including a flanged connection with the plate 18 by telescopic engagement in the opening 30 which accurately aligns the pump and clutch and maintains such alignment when assembled by inserting the bolt-type fasteners 64 and 40 which enables removal of either the pump or clutch and facilitates the installation, repair and maintenance of these components thereby reducing the skill level required by individuals installing the assembly and by individuals repairing and maintaining the pump and clutch assembly. The supporting bracket takes all the load from the pump shaft except for rotational torque necessary to drive the pump in a conventional manner thereby prolonging the effective life of the pump as well as the effective life of the clutch by maintaining the clutch components in accurate relation to each other.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A supporting bracket combined with a clutch and pump, said supporting bracket including a rigidly supported plate having means engaging a portion of the pump and a portion of the clutch to maintain the pump and clutch in aligned relation, means separably securing the clutch to the plate, means securing the pump to the plate to enable removal of the pump, said clutch including means connected with a power input, said bracket, pump and clutch including coacting means transmitting rotational torque from the power input to the pump without transferring radial or axial forces to a pump shaft, said clutch being an electromagnetic clutch, said pump being a hydraulic pump for supplying pressurized fluid, said means securing the clutch to the plate including apertures in the plate and stationary component of the clutch with fastener bolts extending therethrough, said means securing the pump to the plate including a flange on the pump with apertures therein matching with apertures in the plate for receiving fastening bolts, said fastening bolts securing the pump flange of the plate also extending into the clutch, said bolts securing the clutch to the plate including bolts accessible independently of the bolts securing the pump to the plate and clutch thereby enabling selective removal of the components.

2. The structure as defined in claim 1 wherein said plate includes a supporting base member perpendicular to the plate provided with apertures receiving supporting bolts.

3. The structure as defined in claim 2 wherein said clutch and pump include a projection closely fitting and telescoping into an opening in the plate, said opening being larger than the pump shaft and spaced peripherally thereof, said clutch having a splined connection with the pump shaft.

4. In combination, a first power unit having a rotatable component, a second power unit having a rotatable component, clutch means selectively interconnecting said rotatable components for transmitting rotational torque therebetween, and a supporting bracket for said power units, rotatable components and clutch means, said supporting bracket comprising a plate positioned between said clutch means and one of said power units, fastener means separably mounting said clutch means on one surface of said plate, means separably and drivingly connecting the rotatable component on said one power unit to said clutch means, means separably mounting the other power unit on the other surface of said plate, and means separably and drivingly connecting the rotatable component of said other power unit to said clutch means, said plate including means for rigidly mounting the plate to a supporting structure for supporting said power units and clutch means and enabling independent removal of the power units and clutch means without removal of the plate, said plate having an opening therethrough receiving the rotatable component on said other power unit with the rotatable component being spaced from and unsupported by said opening.

5. The combination as defined in claim 4 wherein said other power unit includes a housing having a projection telescopically received in said opening in close fitting relation thereto for accurately positioning the housing and rotatable component in relation to the opening and the plate, said clutch means including a projection telescopically received in said opening in close fitting relation for positioning the clutch means, said plate receiving all forces exerted by the power units and rotatable components except for rotational torque and transferring such forces to a supporting structure thereby prolonging life expectancy of the power units by eliminating transfer of all forces except for rotational torque between said power units.

6. The combination as defined in claim 5 wherein said first power unit is a power input shaft, said rotatable component thereon being a flange on the end of the shaft, said means connecting the rotatable component to the clutch means including fastener means extending through the flange into the clutch means, said clutch means being an electromagnetic clutch having an input hub connected to said flange by said fastener means, said second power unit being a hydraulic pump, said rotatable component thereon being a pump shaft, said means connecting the rotatable component thereon to the clutch including a longitudinal splined connection between the pump shaft and output of the clutch, said means mounting the pump on the plate including a flange on the pump housing and fastener means securing the flange to the plate, the fastener means securing the pump to the plate, the clutch to the plate and input shaft to the clutch being independently accessible for selective separation of the components.

* * * * *